US012786779B2

United States Patent
(12) United States Patent
Iwatani et al.

(10) Patent No.: US 12,786,779 B2
(45) Date of Patent: Nov. 3, 2026

(54) WIRELESS COMMUNICATION SYSTEM, CENTRALIZED CONTROL DEVICE, CENTRALIZED CONTROL METHOD AND CENTRALIZED CONTROL PROGRAM

(71) Applicant: NTT, Inc., Tokyo (JP)

(72) Inventors: Junichi Iwatani, Musashino (JP); Hirantha Abeysekera, Musashino (JP); Yusuke Asai, Musashino (JP); Shoko Shinohara, Musashino (JP); Tomoyuki Yamada, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 19/129,679

(22) PCT Filed: Dec. 13, 2022

(86) PCT No.: PCT/JP2022/045845

§ 371 (c)(1),
(2) Date: May 14, 2025

(87) PCT Pub. No.: WO2024/127499

PCT Pub. Date: Jun. 20, 2024

(65) Prior Publication Data

US 2026/0197696 A1 Jul. 9, 2026

(51) Int. Cl.

*H04W 28/02* (2009.01)
*H04W 28/08* (2023.01)

(52) U.S. Cl.

CPC ... *H04W 28/0263* (2013.01); *H04W 28/0257* (2013.01); *H04W 28/0875* (2020.05)

(58) Field of Classification Search

CPC ......... H04W 28/0263; H04W 28/0257; H04W 28/0875

See application file for complete search history.

(56) References Cited

U.S. PATENT DOCUMENTS

2017/0311204 A1* 10/2017 Cariou ................ H04W 28/085
2019/0104441 A1* 4/2019 Guo ...................... H04W 52/34
2025/0220510 A1* 7/2025 Sakaue ................... H04L 47/10

OTHER PUBLICATIONS

Abeysekera et al., "Network Controlled Frequency Channel and Bandwidth Allocation Scheme for IEEE 802.11a/n/ac Wireless LANs: RATOP", 2014 IEEE 25th International Symposium on Personal, Indoor and Mobile Radio Communications, 2014, pp. 1041-1045.

* cited by examiner

*Primary Examiner* — G. C. Neurauter, Jr.

(74) *Attorney, Agent, or Firm* — XSENSUS LLP

(57) ABSTRACT

A wireless communication system according to an embodiment includes: a plurality of access points that perform wireless communication with wireless terminals; and a centralized control device that centrally controls each of the access points and relay devices, and the centralized control device calculates a ratio of a transmittable traffic volume to an accommodated traffic volume based on an allocated channel and bandwidth as a utility function, sets a value corresponding to a transmittable traffic volume of a higher-level device in a relay configuration as an accommodated traffic volume of a lower-level device on the basis of each of the calculated utility functions, and performs control to change the channel and the bandwidth of each of the plurality of access points and the plurality of relay devices such that a sum of the utility functions calculated after setting the accommodated traffic volume is maximized.

3 Claims, 9 Drawing Sheets

WIRELESS COMMUNICATION SYSTEM, CENTRALIZED CONTROL DEVICE, CENTRALIZED CONTROL METHOD AND CENTRALIZED CONTROL PROGRAM

CROSS-REFERENCE TO RELATED APPLICATION

This application is a national stage application, pursuant to 35 U.S.C. § 371, of International Patent Application No. PCT/JP2022/045845, filed Dec. 13, 2022, the entire contents of which are incorporated herein by reference.

TECHNICAL FIELD

The present invention relates to a wireless communication system, a centralized control device, a centralized control method, and a centralized control program.

BACKGROUND ART

A resource allocation based on area throughput optimization policy (RATOP) is known as a method of maximizing effective throughput of an entire system by centrally controlling a frequency bandwidth and a channel used by an AP of a wireless LAN (refer to NPL 1, for example).

In RATOP, a centralized control device ascertains the state of each AP and allocates radio resources such as a frequency channel and a bandwidth to be used by each AP.

For example, in RATOP, the ratio (utility function) of an estimated amount of a traffic volume that can be transmitted (transmittable traffic volume) based on allocated radio resources (a channel and a bandwidth) to an estimated value of a maximum traffic volume (accommodated traffic volume) of each AP is defined as an evaluation index for allocation of the radio resources. Then, the centralized control device performs control to maximize the total value of utility functions.

CITATION LIST

Non Patent Literature

[NPL 1] B. A. Hirantha Sithira Abeysekera et al., "Network Controlled Frequency Channel and Bandwidth Allocation Scheme for IEEE 802.11a/n/ac Wireless LANs: RATOP", 2014 IEEE 25th International Symposium on Personal, Indoor and Mobile Radio Communications, pp. 1041-1045

SUMMARY OF INVENTION

Technical Problem

However, in a conventional centralized control scheme for radio resources such as RATOP, there is a problem in that, in a case where a relay device relays traffic, it is not possible to efficiently increase the effective throughput of the entire system.

An object of the present invention is to provide a wireless communication system, a centralized control device, a centralized control method, and a centralized control program that can centrally control the allocation of radio resources to efficiently expand the communication capacity of the entire system in a case where a relay device relays traffic.

Solution to Problem

A wireless communication system according to an embodiment of the present invention is a wireless communication system including: a plurality of access points that perform wireless communication via a plurality of relay devices that accommodate wireless terminals; and a centralized control device that centrally controls each of the access points and the relay devices, in which the centralized control device includes: a utility function calculation unit that calculates, for each of the plurality of access points and the plurality of relay devices, a ratio of a transmittable traffic volume to an accommodated traffic volume based on an allocated channel and bandwidth as a utility function; a setting unit that sets a value corresponding to a transmittable traffic volume of a higher-level device in a relay configuration as an accommodated traffic volume of a lower-level device on the basis of each of the utility functions calculated by the utility function calculation unit; and a change control unit that performs control to change the channel and the bandwidth of each of the plurality of access points and the plurality of relay devices such that a sum of the utility functions calculated by the utility function calculation unit after the setting unit sets the accommodated traffic volume is maximized.

A wireless communication system according to another embodiment of the present invention is a wireless communication system including: a plurality of access points that perform wireless communication via a plurality of relay devices that accommodate wireless terminals; and a centralized control device that centrally controls each of the access points and the relay devices, in which the centralized control device includes: a utility function calculation unit that calculates, for each of the plurality of access points and the plurality of relay devices, a ratio of a transmittable traffic volume to an accommodated traffic volume based on an allocated channel and bandwidth as a utility function; a setting unit that sets a value corresponding to a sum of transmittable traffic volumes of lower-level devices in a relay configuration as an accommodated traffic volume of a higher-level device on the basis of each of the utility functions calculated by the utility function calculation unit; and a change control unit that performs control to change the channel and the bandwidth of each of the plurality of access points and the plurality of relay devices such that a sum of the utility functions calculated by the utility function calculation unit after the setting unit sets the accommodated traffic volume is maximized.

A wireless communication system according to still another embodiment of the present invention is a wireless communication system including: a plurality of access points that perform wireless communication via a plurality of relay devices that accommodate wireless terminals; and a centralized control device that centrally controls each of the access points and the relay devices, in which the centralized control device includes: a utility function calculation unit that calculates, for each of the plurality of access points and the plurality of relay devices, a ratio of a transmittable traffic volume to an accommodated traffic volume based on an allocated channel and bandwidth as a utility function; a setting unit that sets, for each of the plurality of access points and the plurality of relay devices, a sum of accommodated traffic volumes of each of the wireless terminals and the relay devices that are connectable as an accommodated traffic volume of its own device on the basis of each of the utility functions calculated by the utility function calculation unit; and a change control unit that performs control to change the channel and the bandwidth of each of the plurality of access points and the plurality of relay devices such that a sum of the utility functions calculated by the utility function calculation unit after the setting unit sets the accommodated traffic volume is maximized.

Further, a centralized control device according to an embodiment of the present invention is a centralized control device that centrally controls a plurality of relay devices that accommodate wireless terminals and a plurality of access points that perform wireless communication via the relay devices, the centralized control device including: a utility function calculation unit that calculates, for each of the plurality of access points and the plurality of relay devices, a ratio of a transmittable traffic volume to an accommodated traffic volume based on an allocated channel and bandwidth as a utility function; a setting unit that sets a value corresponding to a transmittable traffic volume of a higher-level device in a relay configuration as an accommodated traffic volume of a lower-level device on the basis of each of the utility functions calculated by the utility function calculation unit; and a change control unit that performs control to change the channel and the bandwidth of each of the plurality of access points and the plurality of relay devices such that a sum of the utility functions calculated by the utility function calculation unit after the setting unit sets the accommodated traffic volume is maximized.

Further, a centralized control device according to another embodiment of the present invention is a centralized control device that centrally controls a plurality of relay devices that accommodate wireless terminals and a plurality of access points that perform wireless communication via the relay devices, the centralized control device including: a utility function calculation unit that calculates, for each of the plurality of access points and the plurality of relay devices, a ratio of a transmittable traffic volume to an accommodated traffic volume based on an allocated channel and bandwidth as a utility function; a setting unit that sets a value corresponding to a sum of transmittable traffic volumes of lower-level devices in a relay configuration as an accommodated traffic volume of a higher-level device on the basis of each of the utility functions calculated by the utility function calculation unit; and a change control unit that performs control to change the channel and the bandwidth of each of the plurality of access points and the plurality of relay devices such that a sum of the utility functions calculated by the utility function calculation unit after the setting unit sets the accommodated traffic volume is maximized.

Further, a centralized control device according to still another embodiment of the present invention is a centralized control device that centrally controls a plurality of relay devices that accommodate wireless terminals and a plurality of access points that perform wireless communication via the relay devices, the centralized control device including: a utility function calculation unit that calculates, for each of the plurality of access points and the plurality of relay devices, a ratio of a transmittable traffic volume to an accommodated traffic volume based on an allocated channel and bandwidth as a utility function; a setting unit that sets, for each of the plurality of access points and the plurality of relay devices, a sum of accommodated traffic volumes of each of the wireless terminals and the relay devices that are connectable as an accommodated traffic volume of its own device on the basis of each of the utility functions calculated by the utility function calculation unit; and a change control unit that performs control to change the channel and the bandwidth of each of the plurality of access points and the plurality of relay devices such that a sum of the utility functions calculated by the utility function calculation unit after the setting unit sets the accommodated traffic volume is maximized.

Further, a centralized control method according to an embodiment of the present invention is a centralized control method for centrally controlling a plurality of relay devices that accommodate wireless terminals and a plurality of access points that perform wireless communication via the relay devices, the centralized control method including: a utility function calculation step of calculating, for each of the plurality of access points and the plurality of relay devices, a ratio of a transmittable traffic volume to an accommodated traffic volume based on an allocated channel and bandwidth as a utility function; a setting step of setting a value corresponding to a transmittable traffic volume of a higher-level device in a relay configuration as an accommodated traffic volume of a lower-level device on the basis of each of the utility functions calculated in the utility function calculation step; and a change control step of performing control to change the channel and the bandwidth of each of the plurality of access points and the plurality of relay devices such that a sum of the utility functions calculated in the utility function calculation step after setting the accommodated traffic volume in the setting step is maximized.

Advantageous Effects of Invention

According to the present invention, in a case where a relay device relays traffic, it is possible to centrally control the allocation of radio resources to efficiently expand the communication capacity of the entire system.

DESCRIPTION OF EMBODIMENTS

Figure 1:
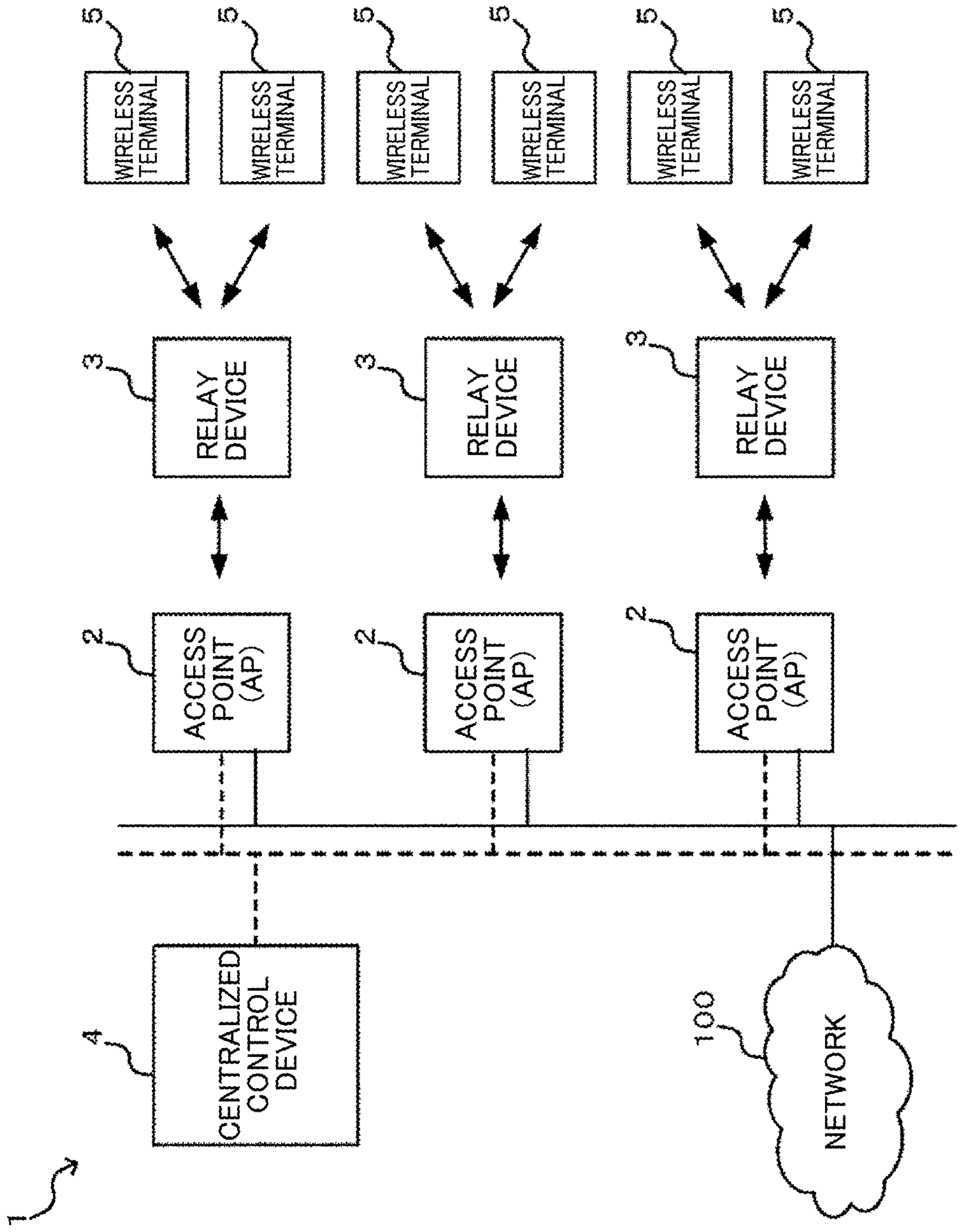
FIG. 1 is a diagram illustrating an overview of a configuration example of a wireless communication system according to one embodiment.

First, an overview of a wireless communication system according to one embodiment will be described. FIG. 1 is a diagram illustrating an overview of a configuration example of a wireless communication system 1 according to one embodiment. The wireless communication system 1 is, for example, a wireless LAN system, and the above-mentioned RATOP is applied thereto.

As illustrated in FIG. 1, the wireless communication system 1 includes, for example, a plurality of access points 2, a plurality of relay devices 3, a centralized control device 4, and a plurality of wireless terminals 5, all of which are connected to a network 100. Each of the access points 2 performs two-way wireless communication (data transmission) with the wireless terminal 5 via any one of the relay devices 3.

Each of the access points 2 and the relay devices 3 is centrally controlled by the centralized control device 4 to accommodate the plurality of wireless terminals 5. For example, each of the access points 2 performs wireless communication with the wireless terminals 5 via the plurality of relay devices 3. Hereinafter, the access point may be referred to as an AP.

The centralized control device 4 controls the RATOP for the plurality of access points 2 and relay devices 3. At this time, it is assumed that a control index is a utility function U (corresponding to a degree of satisfaction) represented by the following Formula (1).

[Math. 1]

$$U_{(b,c)}^{(a)} = \frac{\text{Transmittable traffic volume when bandwidth } b \text{ and channel } c \text{ are used } \Phi_{(b,c,R)}^{(a)}}{\text{Accommodated traffic volume } \theta^{(a)}} \tag{1}$$

a: Identifier of AP
b: Bandwidth
c: Channel (primary channel)
R: Data rate (MCS)

The transmittable traffic volume of the AP(a) depends on the channel usage status of other APs, etc. Further, the accommodated traffic volume (depending on the amount of generated data) is assumed to be a maximum traffic estimated value of AP(a) represented by the following Formula (2), for example.

[Math. 2]

$$\text{Maximum traffic estimated value of } AP(a) \ (= \min\{\text{amount of generated data, transmittable traffic volume when there are no other neighboring } APs\}) \tag{2}$$

The accommodated traffic volume may be calculated by multiplying the accommodated traffic volume per wireless terminal 5 by the estimated number of wireless terminals.

Then, the centralized control device 4 performs processing for maximizing the sum ΣU of the utility functions U according to the following algorithm.

RATOP Algorithm:

(A): The centralized control device 4 "temporarily allocates" a channel/bandwidth to be used by each AP according to a predetermined rule.

(B): The centralized control device 4 calculates the sum ΣU of the utility functions U of the respective APs in the case of (A).

(C): The centralized control device 4 reallocates a channel/bandwidth to an AP having a low utility function U and performs control such that ΣU does not decrease. Then, the centralized control device 4 repeats (C) within a range of predetermined conditions.

Figure 2:
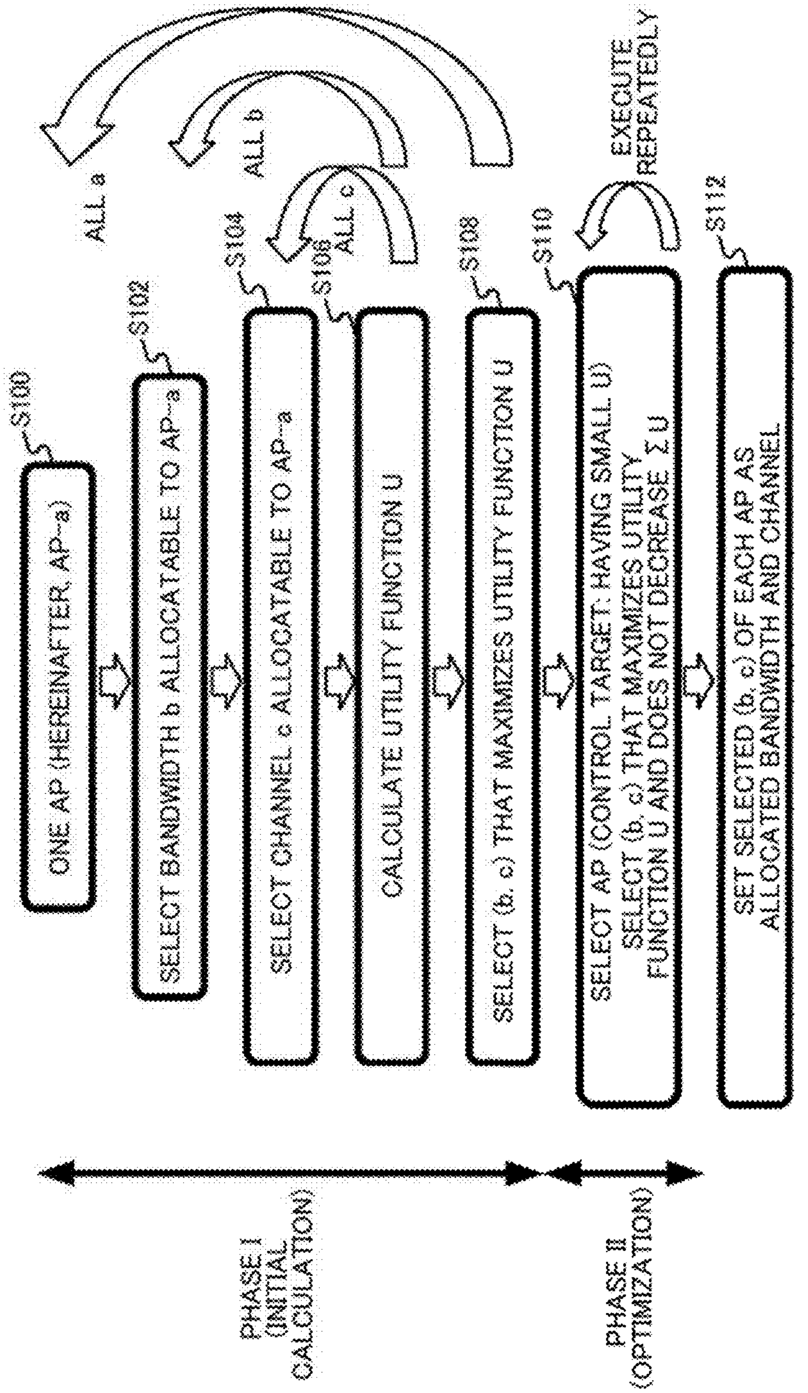
FIG. 2 is a diagram showing a specific example of a RATOP algorithm executed by the centralized control device.

FIG. 2 is a diagram showing a specific example of the RATOP algorithm executed by the centralized control device 4. As shown in FIG. 2, the centralized control device 4 performs processing of phase I (initial calculation) and phase II (optimization).

In phase I, the centralized control device 4 selects one AP as AP-a (S100), selects a bandwidth b allocatable to AP-a (S102), selects a channel c allocatable to AP-a (S104), and calculates a utility function U of AP-a (S106).

Then, the centralized control device 4 executes processing of S104 and processing of S106 for all channels c, and repeats processing for all bandwidths b.

Next, the centralized control device 4 selects a combination (b, c) that maximizes the utility function U (S108) and repeats processing for all APs.

In phase II, the centralized control device 4 selects, for example, an AP having a small utility function U, and then repeats processing for selecting a combination (parameters) of (b, c) that maximizes the utility function U and does not decrease the sum ΣU of the utility functions U (S110).

Then, the centralized control device 4 sets the combination (b, c) selected for each AP as an allocated bandwidth and channel after control.

In this way, in RATOP, the centralized control device 4 ascertains the state of each AP and then allocates a frequency channel and a bandwidth to be used by each AP. The centralized control device 4 defines the ratio (utility function) of an estimated amount of a traffic volume that can be transmitted (transmittable traffic volume) based on allocated radio resources (a channel and a bandwidth) to an estimated value of a maximum traffic volume (accommodated traffic volume) of each AP as an evaluation index for allocation, and performs control in the direction in which the total value of the utility function is maximized.

Figure 3:
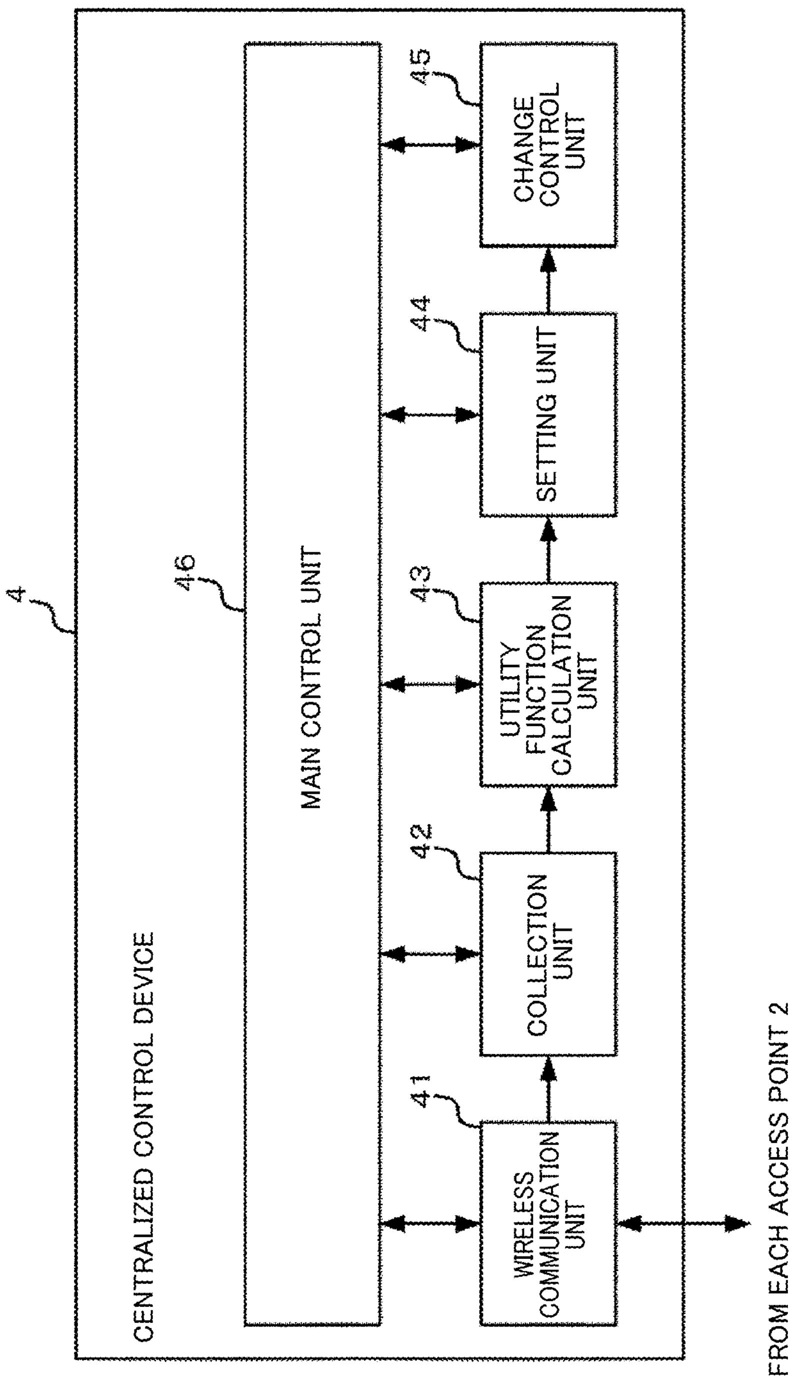
FIG. 3 is a functional block diagram illustrating functions of a centralized control device according to one embodiment.

FIG. 3 is a functional block diagram illustrating functions of the centralized control device 4 according to one embodiment. As illustrated in FIG. 3, the centralized control device 4 includes, for example, a wireless communication unit 41, a collection unit 42, a utility function calculation unit 43, a setting unit 44, a change control unit 45, and a main control unit 46.

The wireless communication unit 41 transmits and receives signals to and from each access point 2 via wireless communication.

The collection unit 42 collects information relating to each of the access point 2, the relay device 3 and the wireless terminal 5 via the wireless communication unit 41, and outputs the information to the utility function calculation unit 43. For example, the collection unit 42 collects information (traffic information, etc.) relating to each of the access point 2, the relay device 3, and the wireless terminal 5.

On the basis of the information collected by the collection unit 42, the utility function calculation unit 43 calculates, as a utility function, a ratio of a transmittable traffic volume based on allocated channel and bandwidth to an accommodated traffic volume for each of the plurality of access points 2 and the plurality of relay devices 3, and outputs the calculated utility function to the setting unit 44.

The setting unit 44 has, as a feature, a function of setting a value corresponding to the transmittable traffic volume of the higher-level device (the same value or a value multiplied by a coefficient, for example) as the accommodated traffic volume of the lower-level device on the basis of each utility function calculated by the utility function calculation unit 43, in order to prevent the allocation of the higher-level device in the relay configuration from becoming a bottleneck and the allocation of the lower-level device from being wasted.

In addition, the setting unit 44 may have, as a feature, a function of setting a value corresponding to the sum of the transmittable traffic volumes of the lower-level devices (the same value or a value multiplied by a coefficient, for example) as the accommodated traffic volume of the higher-level device on the basis of each utility function calculated by the utility function calculation unit 43, such that the higher-level device in the relay configuration can ensure sufficient traffic to accommodate lower-level devices under its control.

In addition, the setting unit 44 may have, as a feature, a function of assuming the number of wireless terminals 5 under its control and the accommodated traffic volume per terminal on the basis of each utility function calculated by the utility function calculation unit 43, in order to make the traffic volume of the entire system just enough relative to the required volume by reflecting the number of each device that performs wireless communication through relaying and the number of devices under its control, and setting, for each of the plurality of access points 2 and the plurality of relay devices 3, the sum of the accommodated traffic volumes of each of the wireless terminals 5 and the relay devices 3 that are connectable as the accommodated traffic volume of its own device.

The change control unit 45 performs control to change the channels and bandwidths of each of the plurality of access points 2 and the plurality of relay devices 3 such that the sum of the utility functions calculated by the utility function calculation unit 43 is maximized after the setting unit 44 sets the accommodated traffic volume.

The main control unit 46 controls each unit constituting the centralized control device 4.

In other words, after the setting unit 44 sets the accommodated traffic volume for each of the plurality of access points 2 and the plurality of relay devices 3, the centralized control device 4 performs control to change the channels and bandwidths of each of the plurality of access points 2 and the plurality of relay devices 3.

Figure 4:
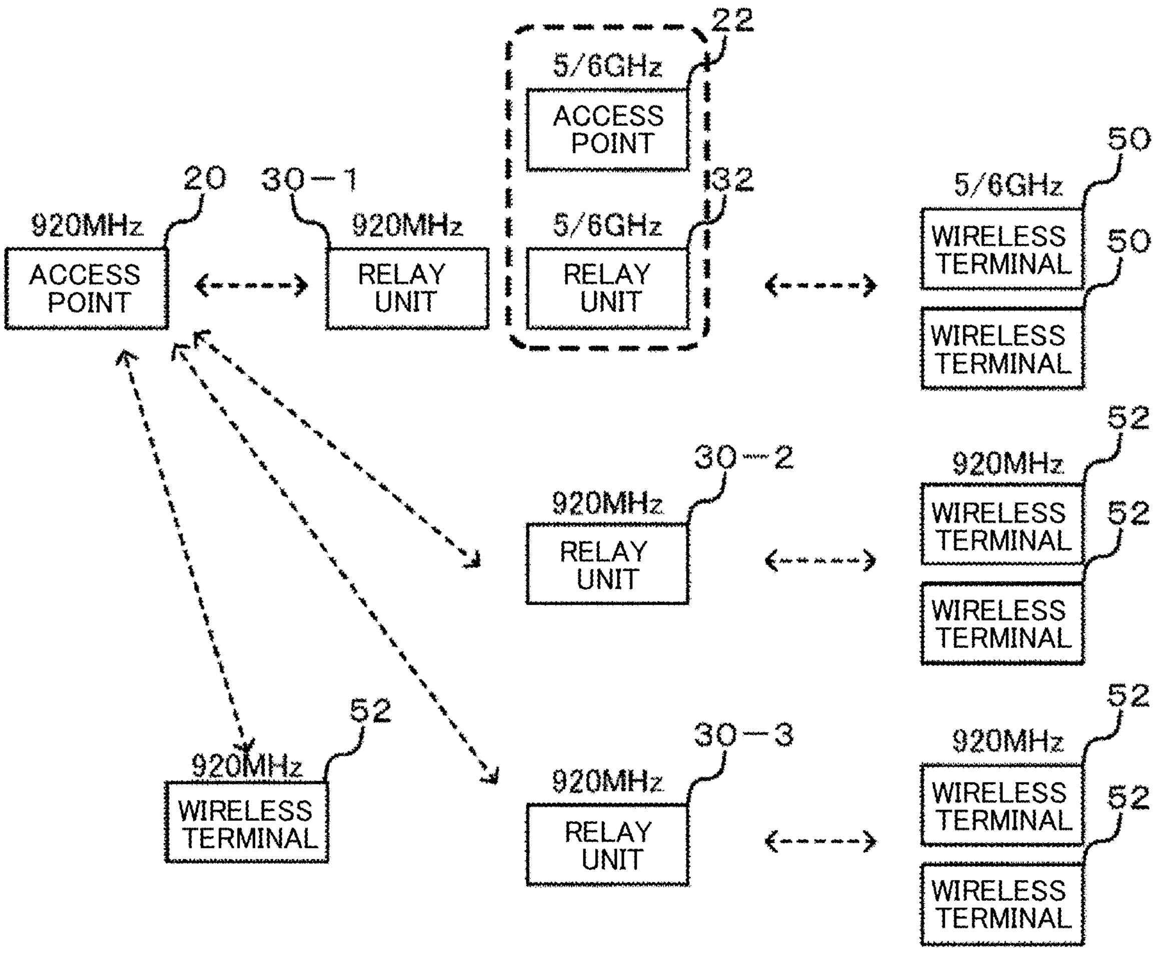
FIG. 4 is a diagram illustrating an overview of a first more specific configuration example of the wireless communication system.

Next, the wireless communication system 1 will be described in more detail. FIG. 4 is a diagram illustrating an overview of a first more specific configuration example of the wireless communication system 1.

In the following more specific configuration examples of the wireless communication system 1, the description will be centered on the control performed by the centralized control device 4 (not illustrated).

The access point 20 is an access point (AP) that performs wireless communication using, for example, a 920 MHz band. The access point 22 is an access point (AP) that performs wireless communication using, for example, a 5/6 GHz band.

Moreover, the relay units 30 (30-1, 30-2, and 30-3) perform wireless communication using, for example, the 920 MHz band. The relay unit 32 performs wireless communication using, for example, the 5/6 GHz band. One or more of the relay units 30 and 32 have the function of one relay device 3.

Also, the wireless terminal 50 performs wireless communication using, for example, the 5/6 GHz band. Also, the wireless terminal 52 performs wireless communication using, for example, the 920 MHz band.

In the example illustrated in FIG. 4, the setting unit 44 sets the accommodated traffic volume of the lower-level device to the same value as the transmittable traffic volume of the higher-level device (or a value multiplied by a coefficient).

First, the centralized control device 4 performs an initial allocation to each device by RATOP in the 920 MHz band and the 5/6 GHz band (in a case where systems using different frequency bands are mixed, allocation is performed by RATOP for each frequency band).

At this time, it is assumed that the transmittable traffic volume of the access point 20 is 2 Mbps. It is also assumed that the access point 22 and the relay unit 32 share radio resources in the 5/6 GHz band, and that the transmittable traffic volume of each is 60 Mbps.

Next, the centralized control device 4 compares the transmittable traffic volume of the access point 20, which is the higher level in the relay configuration, with the transmittable traffic volume of its lower level relay devices (the relay unit 32, the relay unit 30-2, and the relay unit 30-3).

Next, for the lower-level devices (the relay unit 32, the relay unit 30-2, and the relay unit 30-3), in a case where the accommodated traffic volume is greater than the transmittable traffic volume of the higher-level device (the access point 20), the centralized control device 4 sets the accommodated traffic volume to the same value as the transmittable traffic volume of access point 20 (or a numerical value close to the value multiplied by a coefficient).

Here, when setting the accommodated traffic volume, the centralized control device 4 sets the accommodated traffic volume of the relay unit 32 to 2 Mbps since the relay unit 32 is under control of the access point 20 (transmittable traffic volume 2 Mbps). This is because the access point 22 and the relay unit 32 share radio resources, and the transmittable traffic volume is 60 Mbps, but setting the relay unit 32 to a volume exceeding 2 Mbps would be wasteful. Moreover, the transmittable traffic volume of the relay unit 32 is 2 Mbps or less.

Then, the centralized control device 4 again controls RATOP in the entire system on the basis of the set accommodated traffic volume. The centralized control device 4 may control the RATOP only for the relay unit 32, the relay unit 30-2, and the relay unit 30-3.

The relay unit 32 and the access point 22 share radio resources in the same 5/6 GHz band. Therefore, by reducing the waste of the transmittable traffic volume of the relay unit 32, it is possible to increase the transmittable traffic volume of the access point 22 to more than 60 Mbps.

Figure 5:
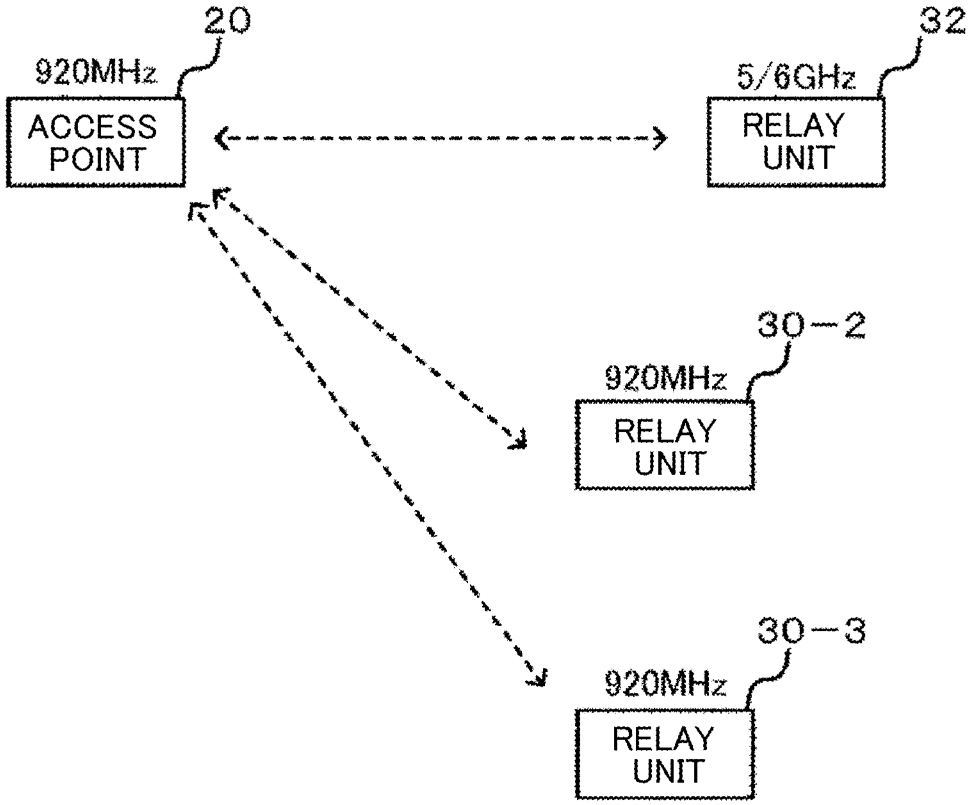
FIG. 5 is a diagram illustrating an overview of a second more specific configuration example of the wireless communication system.

FIG. 5 is a diagram illustrating an overview of a second more specific configuration example of the wireless communication system 1. In the example illustrated in FIG. 5, the setting unit 44 sets a value equal to the sum of the transmittable traffic volumes of the lower-level devices (or a value multiplied by a coefficient) to the accommodated traffic volume of the higher-level device. The centralized control device 4 then increases the transmittable traffic volume of the higher-level device, thereby eliminating the bottleneck in the traffic volume in the higher-level device.

First, the centralized control device 4 performs allocation to each device by RATOP in the 920 MHz band and the 5/6 GHz band (in a case where systems using different frequency bands are mixed, allocation is performed by RATOP for each frequency band).

For example, for a 920 MHz band device, the accommodated traffic volume of the access point 20 is set to $\theta 1$. The accommodated traffic volume of the relay unit 30-2 is set to $\theta 2$. The accommodated traffic volume of the relay unit 30-3 is set to $\theta 3$. In this case, the shared radio resources (total transmittable traffic) is the sum of the transmittable traffic volume $\Phi 1$ of the access point 20, the transmittable traffic volume Φ2 of the relay unit 30-2, and the transmittable traffic volume Φ3 of the relay unit 30-3 (Φ1+Φ2+Φ3=S).

Furthermore, the relay unit 32 accommodates traffic at a frequency (5/6 GHz band) different from that of the relay units 30-2 and 30-3.

The centralized control device 4 performs control by RATOP such that the utility functions of the devices become uniform.

The transmittable traffic volume of the access point 20 is Φ1=S×θ1/(θ1+θ2+θ3). The transmittable traffic volume of the relay unit 30-2 is Φ2=S×θ2/(θ1+θ2+θ3).

The transmittable traffic volume of the relay unit 30-3 is Φ3=S× θ3/(θ1+θ2+θ3).

Moreover, the transmittable traffic volume of the relay unit 32 is set to Φ4 (>Φ1). However, the transmittable traffic volume of the relay unit 32 is limited to @1 at a maximum due to a bottleneck.

The transmittable traffic volume of the access point 20 is smaller than the sum of the transmittable traffic volumes of the devices under its control, and this becomes a bottleneck in the traffic volume of the wireless communication system 1.

Next, the centralized control device 4 sets the accommodated traffic volume of the higher-level device (the access point 20) by reflecting the sum of the transmittable traffic volumes of the lower-level devices under its control (the relay unit 32 and the relay units 30-2 and 30-3).

Then, the centralized control device 4 again controls RATOP in the entire system on the basis of the set accommodated traffic volume. The centralized control device 4 may control the RATOP only for the access point 20 and the relay units 30-2 and 30-3.

For example, the centralized control device 4 resets the accommodated traffic volume of the access point 20 to the sum of the transmitted traffic volumes of the devices under its control, θ1a=Φ2+Φ3+Φ4 (>θ1). The transmittable traffic volume is Φ1a=S×θ1a/(θ1a+θ2+θ3), which is greater than ¢1.

The transmittable traffic volume of the relay unit 30-2 is Φ2a=S× θ2/(θ1a+θ2+θ3).

The transmittable traffic volume of the relay unit 30-3 is Φ3a=S×θ3/(θ1a+θ2+θ3).

The transmittable traffic volume Φ4a of the relay unit 32 becomes Φ1a (>Φ1) at a maximum due to a bottleneck.

Furthermore, due to the resetting, the transmittable traffic volume becomes Φ1<Φ1a, Φ2>Φ2a, and Φ3>Φ3a (θ1a>θ1, ΣΦ=ΣΦa=S). Since Φ1a is greater than Φ1, the bottleneck caused by the access point 20 for the relay unit 32 can be alleviated, and the bottleneck for the relay units 30-2 and 30-3 can also be alleviated.

Figure 6:
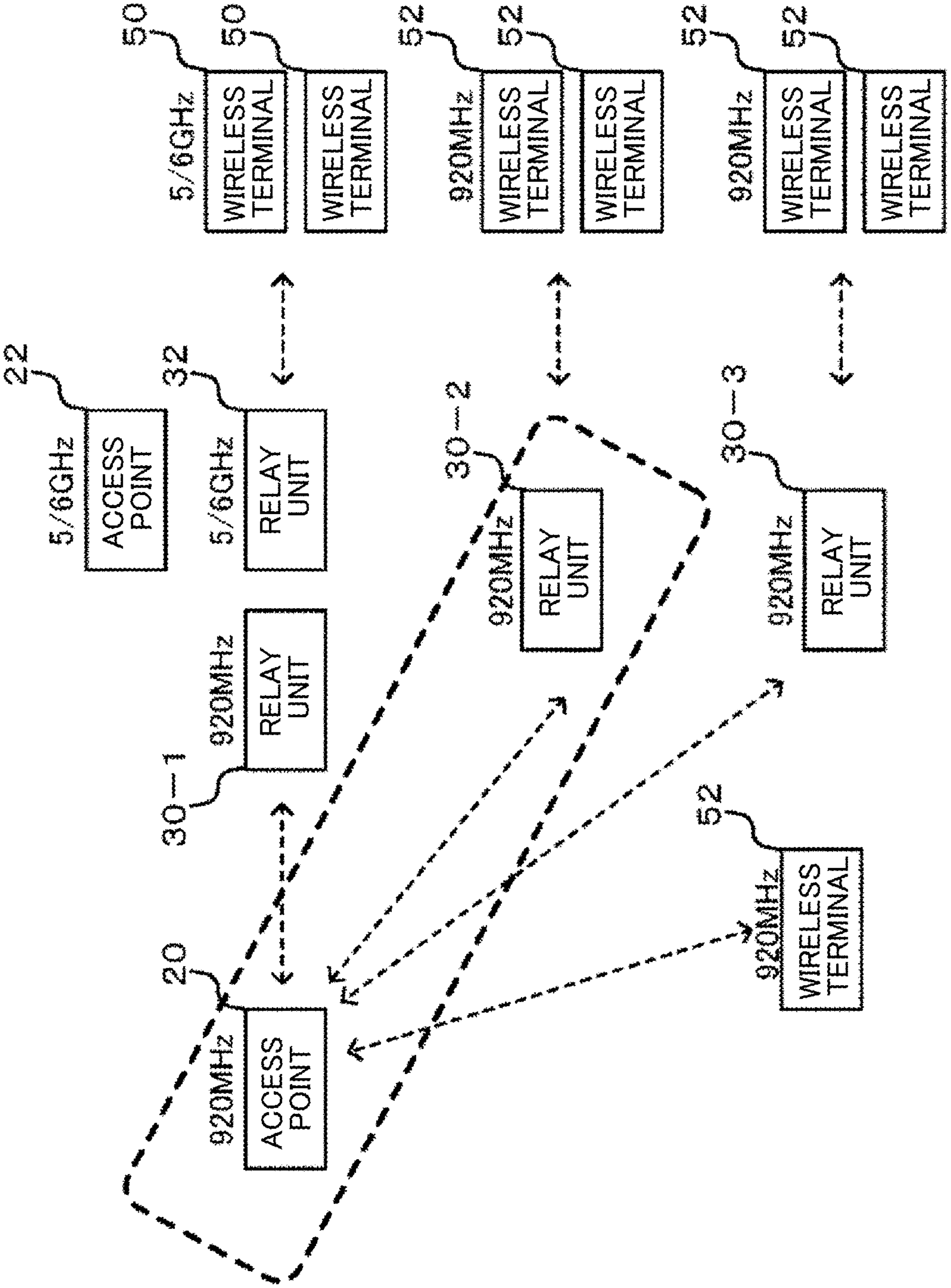
FIG. 6 is a diagram illustrating an overview of a third more specific configuration example of the wireless communication system.

FIG. 6 is a diagram illustrating an overview of a third more specific configuration example of the wireless communication system 1. In the example illustrated in FIG. 6, the setting unit 44 sets a value equal to the sum of the transmittable traffic volumes of the lower-level devices (or a value multiplied by a coefficient) to the accommodated traffic volume of the higher-level device. The centralized control device 4 then increases the transmittable traffic volume of the higher-level device, thereby eliminating the bottleneck in the traffic volume in the higher-level device.

In the example illustrated in FIG. 6, the access point 20 has an accommodated traffic volume of 4 Mbps and a transmittable traffic volume of 2 Mbps. The relay unit 30-2 has an accommodated traffic volume of 4 Mbps and a transmittable traffic volume of 2 Mbps.

It is assumed here that the access point 20 and relay unit 30-2 using the 920 MHz band have shared radio resources (total transmittable traffic) of 4 Mbps (for simplicity, it is assumed here that radio resources are not shared with surrounding wireless devices).

The relay unit 32 has a transmittable traffic volume of 60 Mbps. However, since the higher-level device is a bottleneck in the relay unit 32, the transmittable traffic volume here is 2 Mbps at a maximum.

When the centralized control device 4 reexecutes RATOP, it recalculates the accommodated traffic volume of the access point 20 from the sum of the transmittable traffic volumes of the relay units 32 and 30-2 under its control as 60+2=62. The transmittable traffic volume becomes greater than 2 Mbps (for example, 4×(62/(62+2))=3.85 Mbps.

The relay unit 30-2 has an accommodated traffic volume of 4 Mbps and a transmittable traffic volume smaller than 2 Mbps (for example, 4×(2/(62+2))=0.125 Mbps.

The relay unit 32 has a transmittable traffic volume of 60 Mbps, but due to a bottleneck in the higher-level device, the maximum transmittable traffic volume is 3.85 Mbps.

The substantial maximum traffic volume of the relay unit 32 (5/6 GHZ) under the control of the access point 20 increases from 2 Mbps to 3.85 Mbps.

Figure 7:
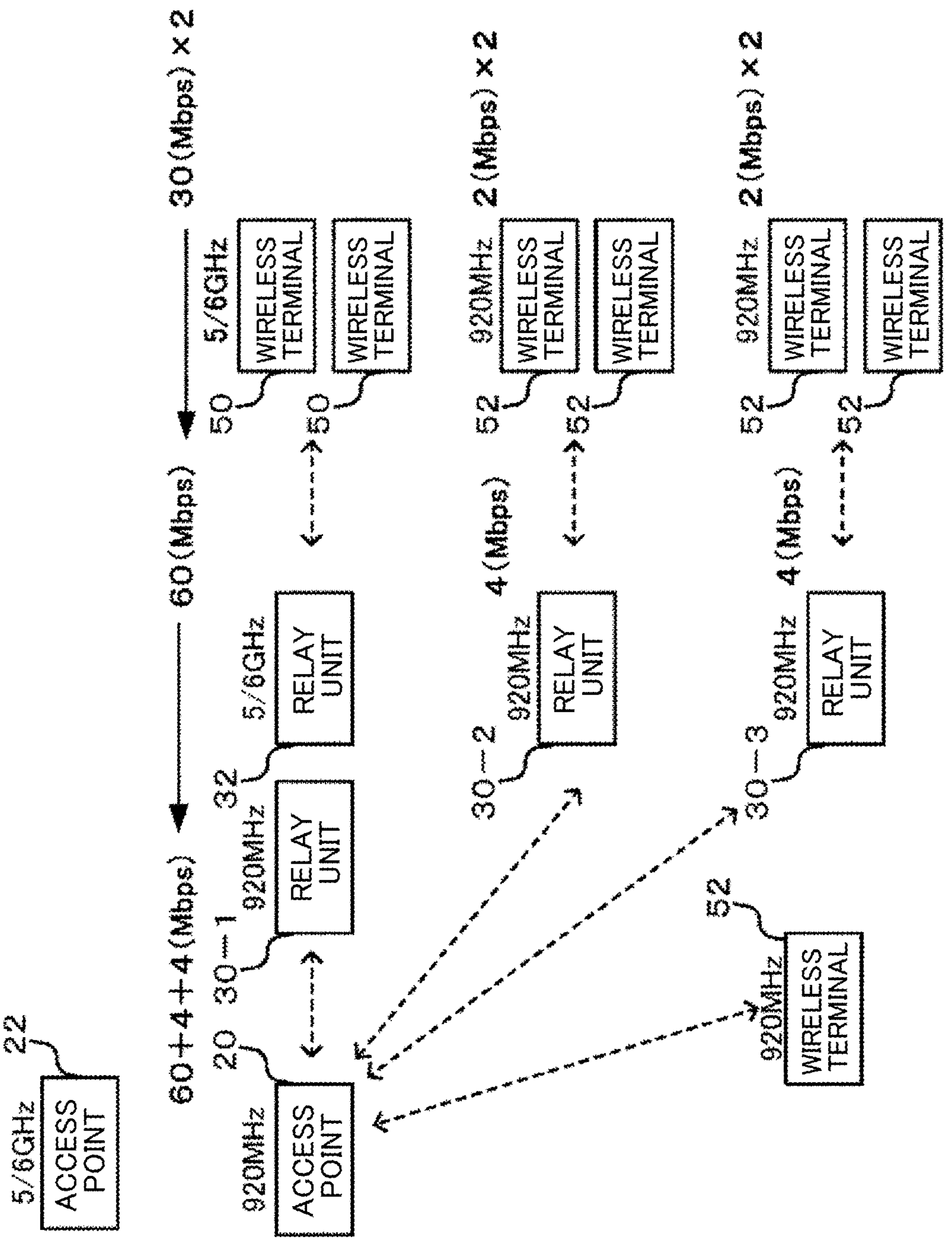
FIG. 7 is a diagram illustrating an overview of a fourth more specific configuration example of the wireless communication system.

FIG. 7 is a diagram illustrating an overview of a fourth more specific configuration example of the wireless communication system 1. In the example illustrated in FIG. 7, the setting unit 44 assumes, for example, for each access point or relay device, the number of wireless terminals under its control and the accommodated traffic volume per terminal, and sets the sum of the accommodated traffic volumes of the wireless terminals under its control as its own accommodated traffic volume. For example, when setting the accommodated traffic volume, the centralized control device 4 aggregates from the lowest level. Furthermore, the wireless communication system 1 may have a large number of hops, or may have an unclear number of wireless terminals and only a known number of relay devices.

For example, the centralized control device 4 assumes the accommodated traffic volume of each terminal for each frequency band. Then, the centralized control device 4 calculates the accommodated traffic volume for each access point/relay device, starting from the lowest level, on the basis of the number of wireless terminals and relay devices under its control.

Then, the centralized control device 4 controls RATOP in the entire system on the basis of the accommodated traffic volume, starting from the lowest level.

For example, the accommodated traffic volume of the access point 20 is set to 60+4+4 Mbps by combining 30 Mbps×2→60 Mbps relayed by the relay unit 32, 2 Mbps×2→4 Mbps relayed by the relay unit 30-2, and 2 Mbps×2→4 Mbps relayed by the relay unit 30-3.

Figure 8:
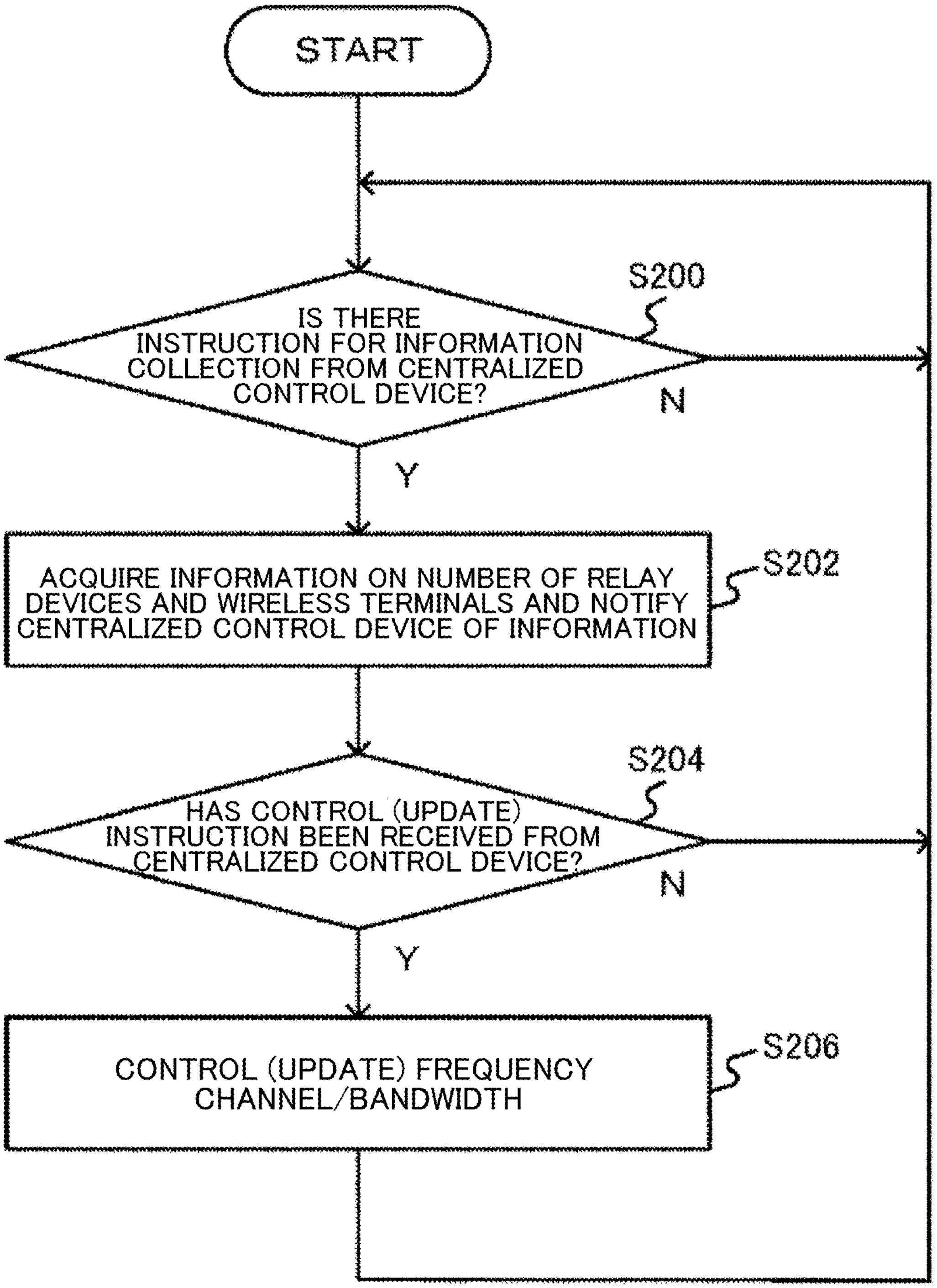
FIG. 8 is a flowchart showing an operation example of the wireless communication system according to one embodiment.

Next, an example of the overall operation of the wireless communication system 1 will be described. FIG. 8 is a flowchart showing an example of operation in a case where the wireless communication system 1 according to one embodiment takes into account the number of wireless terminals.

First, each of the access points determines whether or not there is an instruction for information collection from the centralized control device 4 (S200), proceeds to processing of S202 if there is an instruction (S200: Yes), and repeats processing of S200 if there is no instruction (S200: No).

In step 202 (S202), each access point acquires information on the number of relay devices and wireless terminals accommodated therein, and notifies the centralized control device 4 of the information.

In step 204 (S204), each access point determines whether or not a control instruction to update the bandwidth b and channel c (parameters) of the relay device and the wireless terminal that it accommodates (or a control instruction to update the traffic distribution) has been received from the centralized control device 4. Each access point proceeds to processing of S206 upon determining that the control instruction has been received (S204: Yes) and returns to processing of S200 upon determining that the control instruction has not been received (S204: No).

In step 206 (S206), each access point performs change control (or control to update traffic distribution) for changing the bandwidth b and the channel c (parameters).

In this way, in the wireless communication system 1 according to one embodiment, since the setting unit 44 sets the accommodated traffic volume, and the change control unit 45 performs control to change the channels and bandwidths of each of the plurality of access points and the plurality of relay devices, in a case where the relay device relays traffic, the allocation of radio resources can be centrally controlled to efficiently expand the communication capacity of the entire system.

Note that some or all of the functions of the centralized control device 4 may be configured by hardware such as a programmable logic device (PLD) or a field programmable gate array (FPGA), or may be configured as a program executed by a processor such as a CPU.

For example, the centralized control device 4 can be implemented by using a computer and a program, and the program can be recorded in a storage medium or provided through a network.

Figure 9:
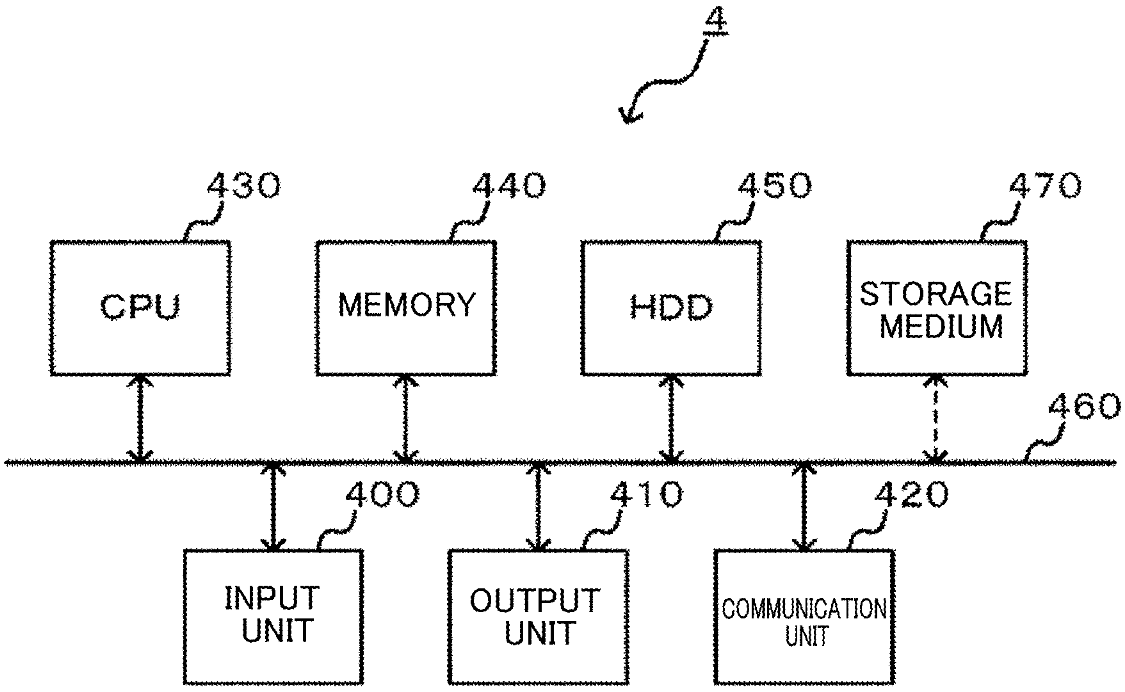
FIG. 9 is a diagram illustrating a hardware configuration of the centralized control device according to one embodiment.

FIG. 9 is a diagram illustrating a hardware configuration of the centralized control device 4 according to one embodiment. As illustrated in FIG. 9, the centralized control device 4 includes an input unit 400, an output unit 410, a communication unit 420, a CPU 430, a memory 440, and an HDD 450 connected via a bus 460, and has functions of a computer. Further, the centralized control device 4 is configured to be able to input/output data to/from a computer-readable storage medium 470.

The input unit 400 is, for example, a keyboard, a mouse, and the like. The output unit 410 is, for example, a display device such as a display.

The communication unit 420 is a communication interface that performs wireless communication using, for example, a wireless LAN.

The CPU 430 controls each unit constituting the centralized control device 4 and performs predetermined processing and the like. The memory 440 and the HDD 450 store data and the like.

The storage medium 470 is capable of storing a program and the like for executing the functions of the centralized control device 4. The architecture constituting the centralized control device 4 is not limited to the example illustrated in FIG. 9.

REFERENCE SIGNS LIST

1 Wireless communication system
2, 20, 22 Access point
3 Relay device
4 Centralized control device
5, 50, 52 Wireless terminal
30-1 to 30-3, 32 Relay unit
41 Wireless communication unit
42 Collection unit
43 Utility function calculation unit
44 Setting unit
45 Change control unit
46 Main control unit
100 Network
400 Input unit
410 Output unit
420 Communication unit
430 CPU
440 Memory
450 HDD
460 Bus
470 Storage medium

The invention claimed is:

1. A wireless communication system comprising:
a plurality of access points that perform wireless communication via a plurality of relay devices that accommodate wireless terminals; and
a centralized control device that centrally controls each of the access points and the relay devices,
wherein the centralized control device includes:
utility function calculation circuitry configured to calculate, for each of the plurality of access points and the plurality of relay devices, a ratio of a transmittable traffic volume to an accommodated traffic volume based on an allocated channel and bandwidth as a utility function;
setting circuitry configured to set a value corresponding to a transmittable traffic volume of a higher-level device in a relay configuration as an accommodated traffic volume of a lower-level device on the basis of each of the utility functions calculated by the utility function calculation circuitry; and
change control circuitry configured to perform control to change the channel and the bandwidth of each of the plurality of access points and the plurality of relay devices such that a sum of the utility functions calculated by the utility function calculation circuitry after the setting circuitry set the accommodated traffic volume is maximized.

2. A wireless communication system comprising:
a plurality of access points that perform wireless communication via a plurality of relay devices that accommodate wireless terminals; and
a centralized control device that centrally controls each of the access points and the relay devices,
wherein the centralized control device includes:
utility function calculation circuitry configured to calculate, for each of the plurality of access points and the plurality of relay devices, a ratio of a transmittable traffic volume to an accommodated traffic volume based on an allocated channel and bandwidth as a utility function;
setting circuitry configured to set a value corresponding to a sum of transmittable traffic volumes of lower-level devices in a relay configuration as an accommodated traffic volume of a higher-level device on the basis of each of the utility functions calculated by the utility function calculation circuitry; and
change control circuitry configured to perform control to change the channel and the bandwidth of each of the plurality of access points and the plurality of relay devices such that a sum of the utility functions calculated by the utility function calculation circuitry after the setting circuitry set the accommodated traffic volume is maximized.

3. A wireless communication system comprising:

a plurality of access points that perform wireless communication via a plurality of relay devices that accommodate wireless terminals; and a centralized control device that centrally controls each of the access points and the relay devices, wherein the centralized control device includes:

utility function calculation circuitry configured to calculate, for each of the plurality of access points and the plurality of relay devices, a ratio of a transmittable traffic volume to an accommodated traffic volume based on an allocated channel and bandwidth as a utility function;

setting circuitry configured to set, for each of the plurality of access points and the plurality of relay devices, a sum of accommodated traffic volumes of each of the wireless terminals and the relay devices that are connectable as an accommodated traffic volume of its own device on the basis of each of the utility functions calculated by the utility function calculation circuitry; and change control circuitry configured to perform control to change the channel and the bandwidth of each of the plurality of access points and the plurality of relay devices such that a sum of the utility functions calculated by the utility function calculation circuitry after the setting circuitry set the accommodated traffic volume is maximized.

* * * * *